Dec. 10, 1968  N. L. CHATHAM  3,415,549
CABLE HOUSING ANCHORING UNIT
Filed Sept. 23, 1965  2 Sheets-Sheet 2

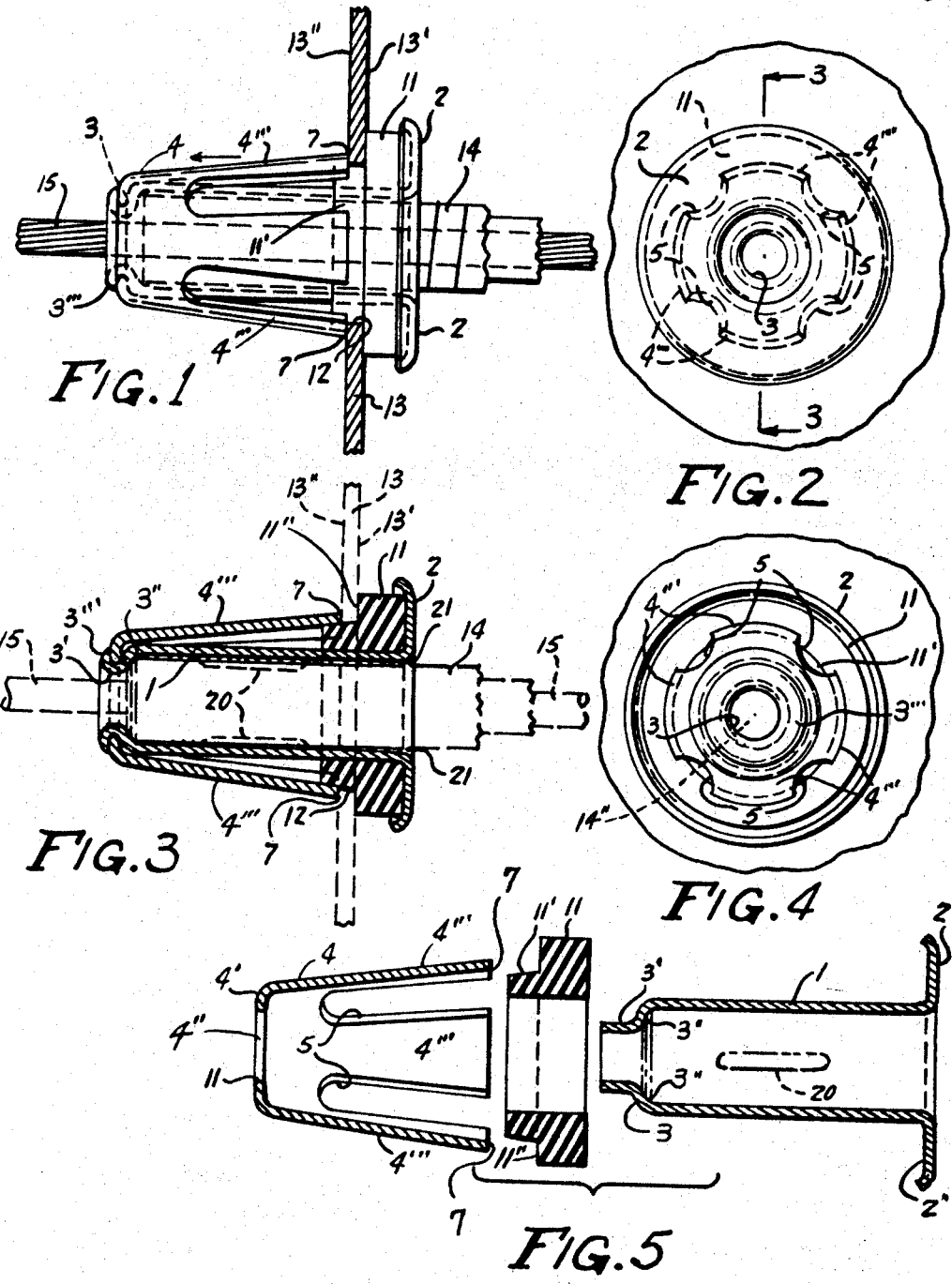

INVENTOR.
NEWTON L. CHATHAM
BY  *J. Wesley Everett*
ATTORNEY.

United States Patent Office 3,415,549
Patented Dec. 10, 1968

3,415,549
CABLE HOUSING ANCHORING UNIT
Newton L. Chatham, 1200 Woodmont Ave.,
Williamsport, Pa. 17701
Filed Sept. 23, 1965, Ser. No. 489,691
4 Claims. (Cl. 287—20)

ABSTRACT OF THE DISCLOSURE

A cable housing anchoring unit having an inner tubular member with a flange at one end and a reduced tubular extension at the other end thereof, an outer tubular finger element having an inturned flange at one end permanently attached to the reduced tubular extension and resilient fingers extending outwardly from the tubular finger element in an inclined direction toward the flange of the inner tubular member. A third optional element in the form of a resilient seal may be employed, this seal has a flange abutting the flange of the inner tubular member and a reduced tubular extension which projects along the inner tubular member and under the fingers.

The present invention relates to a cable housing anchoring unit, or means for anchoring the cable to a support, such as a bracket, dashboard, bulkhead, panel and the like.

The invention is carried out by providing an inner cylindrical element which fits into an opening in the dashboard panel or other support and receives and holds the cable housing therein. A flange at one end of the cylindrical element abuts the support at one side and an outer element equipped with a series of resilient fingers attached to the inner element abuts the support on the other side and anchors the unit and the attached cable in place.

One object of the invention is to provide a unit that is rugged in construction and practical in its operation.

Another object of the invention is to provide a unit that is economical in its production.

A further object of the invention is to provide a unit in which the major elements are permanently fixed together to prevent accidental disengagement with the supporting element.

Still another object of the invention is to provide a unit that may be sealed in a bracket, dashboard, bulkhead, panel board etc. against the passage of fluids, and further between the unit and the cable housing.

While several objects of the invention have been pointed out, other objects, uses and advantages will become more apparent as the nature of the inevntion is more fully disclosed, and the same consists in the novel construction, combination and arrangement of its several parts shown in the accompanying drawings and described in the written description to follow, in which:

FIGURE 1 is a view in elevation of the cable housing anchoring unit showing the unit in operating position in a supporting bracket.

FIGURE 2 is a view in elevation looking toward the left in FIGURE 1.

FIGURE 3 is a sectional view of the unit taken on line 3—3 of FIGURE 2.

FIGURE 4 is a view in elevation looking toward the right in FIGURE 1.

FIGURE 5 is an exploded view showing the several parts in their respective positions before assembly.

Figure 6:
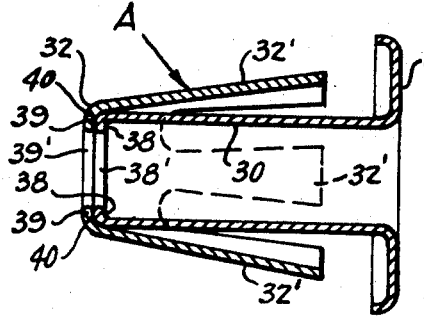
FIGURE 6 is a longitudinal sectional view of an assembled modified form of the unit.

Referring in particular to the drawings, the preferred form of unit for the cable housing is shown in FIGURES 1 to 5 and comprises several primary elements, an inner tubular element, an outer spring finger element, and a compressible reilient sealing element. The inner tubular element 1 is provided with an outer extended flange 2 at one end, and an inwardly turned flange 3 at its opposite end to form a shoulder 3, see FIGURES 1 and 5. Extending outwardly from the inwardly turned flange 3 is an extension 3' for receiving the spring finger member 4, see FIGURE 5.

The second element of the unit is designated by the numeral 4 and is adapted to fit over the cylindrical inner element 1, as shown best in FIGURES 1 and 3. This outer element 4 is slightly of cone shape form, having an inwardly turned flange 4' at one end thereof through which is formed a hole 4" of such size as to fit over the extension 3' of the inner tubular member 1. The fingers 4''' are formed by slitting the element 4, as shown best at 5 in FIGURE 5. While both elements 1 and 4 are shown as constructed of metallic material, both, or either, element may be constructed of any other suitable material, including fiber glass, or one of the plastic materials known commercially as nylon, Delyne, and the like, which may be molded or otherwise formed into the respective parts. The use of these glass fibers and plastic materials will insulate the cable and cable housing from the support.

The third element is a resilient sealing element 11. This element is formed from a resilient substance such as rubber, or from one of the resilient plastic resins. The resilient element is formed with a tapered portion 11' which is adapted to fit tightly within the opening 12 in a bracket 13 in order to aid in making a fluid seal between the unit and the bracket, or other support, into which the unit is fitted. The portion 11' extends through the opening and far enough beneath the fingers 4''' as to engage the fingers when the fingers are depressed and will aid in extending the free end of the fingers radially about the edge of the opening 12.

The several parts may be assembled in any practical and convenient manner or order, either manually or automatically. If the material and assembling operation permit, at least some of the parts may be joined, in addition to beading and welding, by gluing and heat sealing, etc.

One way of assembling the unit is shown in FIGURES 1 to 5, wherein the elatsic member 11 is placed over the member 1. Then the element is placed over the tubular member 1 as shown. The portion 3' of the member 1 is then inserted through the opening 4" until the flange 4' of the outer finger element comes in contact with the flange 3 of the inner tubular member 1. The portion 3' is then beaded, or riveted over the outer edge of the flange 4' as is well shown in FIGURE 3 at 3'''. The unit is now complete to be attached to the cable housing and in turn to the bracket 13, or other suitable support.

While a preferred arrangement is shown in FIGURES 1 to 5 for holding these elements in fixed relationship, this arrangement may take other forms, as shown in FIGURES 6 to 9, and which will be referred to again hereinafter in a more definite manner.

Referring again to FIGURES 1 to 5 and in particular to their assembly with the cable housing 14, the tubular member 1 is of such inner diameter as to slidably receive the cable housing 14 through which a cable 15 is movable. The cable is adapted to slide freely longitudinally, or to be rotated within the housing is rigidly held into fixed position by the housing anchoring unit. The present unit may be secured to either, or both, ends of the cable housing.

The end of the cable housing 14 is inserted into the inner tubular member 1 from the end having the outwardly turned flange 2 until it comes in contact with the inwardly turned shoulder 3''.

The housing 14 is secured to the unit by any convenient means, for example, the tubular element 1 is shown depressed at 20 in FIGURE 3, which may be effected by a punch entering through the slots 5, which are preferably diametrically opposite each other, or the housing may be in any number of other conventional ways.

The space between the inner surface of the tubular member and the outer surface of the cable housing may be filled with a holding and sealing compound, as shown at 21 in FIGURE 3, for aiding the holding of the cable housing within the unit, and for sealing the anchoring unit and the housing within the opening 12 against the passage of fluid.

The distance between the face portion 11'' of the flexible member 11 and the ends 7 of the rigid spring fingers 4'' is slightly less than the thickness of the support 13 in order to compress the member 11 in contact with the bracket.

The opening 12, see FIGURES 1 and 3, is larger in diameter than the diameter of the smaller end of the cone-shaped element 4 and of less diameter than the outwardly extended ends 7 of the fingers 4'''.

After the cable has been attached to the unit and the proper size hole 12 has been provided in the bracket 13, the unit is inserted through the opening 12 in the direction of the arrow shown in FIGURE 1. As the unit is inserted through the opening the fingers 4''' are first depressed and when the unit reaches a point where the fingers are to the outside surface 13'' of the bracket 13, the element 11 and the flange portion 11' will be slightly compressed and the spring fingers 4''' will expand about the edge of the hole 12. As shown in FIGURES 1 and 3, the shoulder 11'' of the resilient sealing element 11 will be forced against the side 13' of the support 13, which, together with the portion 11', will seal the opening in the support, except for the channel through the housing for accommodating the cable 15.

Figure 10:
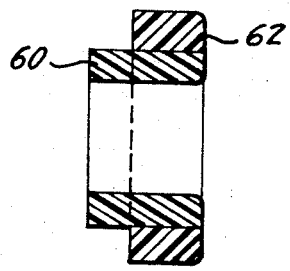
FIGURE 10 is a modified form of resilient sealing element for the unit.
Figure 11:
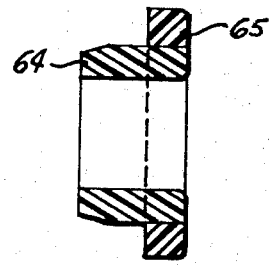
FIGURE 11 is a further modified form of resilient sealing element for the unit.

Referring again to the modified forms A and B of the unit, the unit is likewise made up of three primary parts. Form A comprises an inner tubular element 30, a spring finger element 32 ad a resilient element, as shown in FIGURES 10 and 11.

The inner tubular element of form A is quite similar to that shown in FIGURES 1 to 5, that is, the inner tubular element is provided with a flange 37 on one end thereof, and an inwardly turned flange 38 on its opposite end, leaving an opening 38' through which the cable 15 may extend. The spring finger element 32 is provided with fingers 32'. This element 32 is slightly cone-shaped and is provided with an inwardly turned flange 39 overlapping the flange 38 of the inner tubular member 30. The flange 39 extends over the flange 38 and in contact therewith, and is provided with an opening 39' of substantially the same diameter as its opening 38 in the inner tubular element 30. The flange 38 of the body member and the flange 39 are welded together by spot welding or other satisfactory methods, as shown at 40 in FIGURE 7. The fingers 32' formed on the finger element 32 have their free ends opposite the inwardly turned flanged end 39. These free ends of the fingers 32' are flexible and are adapted to engage a holding element in the form of the bracket 13, bulkhead, etc. in substantially the same manner as described for fingers 4''', shown in FIGURES 1 to 5. The resilient sealing elements are likewise placed between the flange 37 and extend beneath the outer free ends of the fingers, as shown and described for the resilient member 11 in FIGURES 1 to 5. This, as described hereinbefore, helps keep the free ends of the fingers extended outwardly beyond the opening 12 in the support 13.

Figure 8:
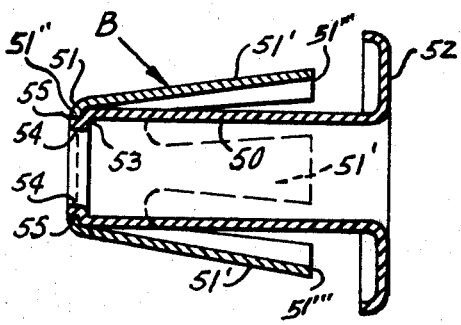
FIGURE 8 is a longitudinal sectional view of a further modified form of unit.
Figure 7:
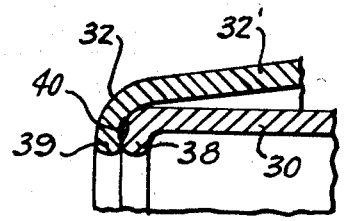
FIGURE 7 is an enlarged fragmentary sectional view of a portion of the modified form of the unit shown in FIGURE 6.
Figure 9:
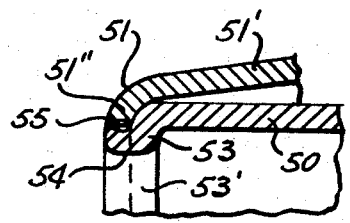
FIGURE 9 is an enlarged fragmentary sectional view of a portion of the modified form of unit shown in FIGURE 8.

A further modified form of unit is illustrated at B in FIGURES 8 and 9. This form is similar to the form shown in FIGURES 6 and 7, in that, it is also provided with an inner tubular element 50 and a spring finger element 51 having extended flexible fingers 51'.

The inner tubular element 50 is provided with an outwardly turned flange 52 extending about one end thereof, and an inwardly turned flange 53, extending about its opposite end and extending beyond the inturned flange 53 is a short extension 54, which is adapted to extend outwardly parallel with the tubular body portion 50 for a distance substantially equal to the thickness of the spring finger element 51, leaving an opening 53' sufficient to allow for the passage of the cable 18.

The spring finger element 51 has an inwardly turned flange 51'' adjacent the end opposite the free open ends of the fingers 51', and is adapted to engage the outer surface of the flange 53 and the extended end portion 54 of the tubular element 50. The inner diameter of the flange 51' provides an opening 5''' for slipping the same over the portion 54 of the tubular element 50. This opening left by the flange element 55 is slightly larger than the outer diameter of the portion 54 of the inner tubular element in order that a substantially thin ring of welding material 55 for welding the flange 51'' of the spring finger element to flange 54 may be inserted. This type of arrangement is ideal for the use of induction welding by high frequency electric current.

One modified form of a resilient sealing element is shown in FIGURE 10. In this form there is a tubular portion 60 and a collar like portion 62, which is adapted to telescope the tubular member 60. This differs from the form shown in FIGURES 1 to 5, in which the resilient member is shown as one-piece unit.

Another modified form of a two-piece resilient sealing element is illustrated in FIGURE 11. This form also has a tubular portion 64 and a collar portion 65 telescoping the tubular member 64.

The object of these modified forms of resilient sealing members is to provide a sealing element that is adaptable to differences in thickness of supports, brackets, bulkheads, etc., that is, the aperture 12 may be made of the proper size to receive the tubular portions, which may be made of standard size, while the collar portions 62 and 65 may be made of such thickness as to accommodate the thickness of the holding bracket, etc.

While several ways of uniting the elements 1 and 4 have been specifically illustrated and pointed out in the description, there are other ways of accomplishing this unity which would present itself to those skilled in the art. For example, the reverse construction shown in FIGURES 1 to 5 may be employed, that is, a flange and an inwardly turned neck may be carried by the spring finger element through an opening in the inner tubular element where it would be beaded, riveted or welded against or to the inside surface of the inwardly turned flange carried by the inner tubular element. Therefore, the illustrations are not intended as a limitation, as the scope of the invention is best defined in the appended claims.

I claim:

1. A cable housing anchoring unit wherein the unit is attachable within an opening in a supporting element for fixing the position of at least one end of the cable housing for allowing the movement of a cable through the housing and the anchoring unit comprising:

(a) an inner tubular element having an inside diameter and one open end of such size as to slidably receive the cable housing;

(b) said inner tubular member having an outwardly extended flange adjacent the end through which the cable housing is slidable and an inwardly extending flange at its opposite end having an opening of less diameter than the outer diameter of the cable housing;

(c) the opening in the inner flanged end of the inner tubular element being of such size as to freely admit the passage of the cable therethrough, the inwardly turned flange forming a shoulder against which the end of the cable housing extending within the inner tubular element is adapted to abut and means for securing the end of the cable housing within the said tubular housing;

(d) an outer tubular finger element of slightly larger inside diameter than the outside diameter of the inner tubular member adapted to extend over the inwardly flanged end of the inner tubular element;

(e) the finger element having at one end thereof an inturned flange and an opening therethrough to admit the said cable and the opposite end thereof being provided with a plurality of depressible finger members extending outwardly toward the opposite end thereof and in the direction of the outwardly extended flange of the inner tubular element;

(f) said inner tubular element being provided with a hollow extension of reduced diameter extending outwardly from said inturned flange of such length as to extend through the opening in the inwardly turned flange of the outer finger element and expanded beyond the outer adjacent surface of the inturned flange in the said outer finger element for affixing the finger element to the tubular element.

2. A cable housing anchoring unit wherein the unit is attachable within an opening in a supporting element for fixing the position of at least one end of the cable housing for allowing the movement of a cable through the hounsing and the anchoring unit comprising:

(a) an inner tubular element having an inside diameter and one open end of such size as to slidably receive the cable housing;

(b) said inner tubular member having an outwardly extended flange adjacent the end through which the cable housing is slidable and an inwardly extending flange at its opposite end having an opening of less diameter than the outer diameter of the cable housing;

(c) the opening in the inner flanged end of the inner tubular element being of such size as to freely admit the passage of the cable therethrough, the inwardly turned flange forming a shoulder against which the end of the cable housing extending within the inner tubular element is adapted to abut and means for securing the end of the cable housing within the said tubular housing;

(d) an outer tubular finger element of slightly larger inside diameter than the outside diameter of the inner tubular member adapted to extend over the inwardly flanged end of the inner tubular element;

(e) the finger element having at one end thereof an inturned flange and an opening therethrough to admit the said cable and the opposite end thereof being provided with a plurality of depressible finger members extending outwardly toward the opposite end thereof and in the direction of the outwardly extended flange of the inner tubular element;

(f) said inner tubular element being provided with a reduced portion extending outwardly from the inwardly turned flange over which the opening in the inwardly turned flange of the finger element is slidably receivable for positioning the same over the inner tubular element; and (g) means for rigidly and permanently fastening the reduced portion and inwardly turned flange together.

3. An anchoring fixture as claimed in claim 2 wherein a weldable material is positioned between at least a part of the contacting surfaces between the inner tubular element and the outer finger element adjacent their end having the inwardly turned flanges for welding the said elements together by means of an inducted electric current.

4. An anchoring fixture as claimed in claim 2 wherein a resilient element surrounds the inner tubular member in abuting relation with said outwardly extending flange, said resilient element having a portion extending beneath the fingers of the outer finger element to assist in urging the fingers to extended position away from said inner tubular member.

References Cited

UNITED STATES PATENTS

| | | | |
|---|---|---|---|
| 2,954,248 | 9/1960 | Brickman | 287—20 |
| 3,101,205 | 8/1963 | Benham | 285—194 |
| 3,012,744 | 12/1961 | Damon et al. | 287—20 |
| 3,139,768 | 7/1964 | Biesecker | 287—20 |
| 3,221,572 | 12/1965 | Swick | 287—20 |

CARL W. TOMLIN, *Primary Examiner.*

W. L. SHEDD, *Assistant Examiner.*

U.S. Cl. X.R.

339—128; 287—189.36; 285—162